United States Patent
Laverdiere-Papineau et al.

(10) Patent No.: US 9,613,222 B2
(45) Date of Patent: Apr. 4, 2017

(54) ASSIGNING ACCESS RIGHTS IN ENTERPRISE DIGITAL RIGHTS MANAGEMENT SYSTEMS

(75) Inventors: Marc-Andre Laverdiere-Papineau, Andhra Pradesh (IN); Rajamouli Eamula, Andhra Pradesh (IN)

(73) Assignee: TATA CONSULTANCY SERVICES, Mumbai (IN)

( * ) Notice: Subject to any disclaimer, the term of this patent is extended or adjusted under 35 U.S.C. 154(b) by 436 days.

(21) Appl. No.: 13/328,923

(22) Filed: Dec. 16, 2011

(65) Prior Publication Data

US 2013/0061331 A1 Mar. 7, 2013

(30) Foreign Application Priority Data

Sep. 2, 2011 (IN) .......................... 2447/MUM/2011

(51) Int. Cl.
*G06F 21/00* (2013.01)
*G06F 21/62* (2013.01)

(52) U.S. Cl.
CPC ................................ *G06F 21/6218* (2013.01)

(58) Field of Classification Search
CPC .................................................. G06F 21/6218
See application file for complete search history.

(56) References Cited

U.S. PATENT DOCUMENTS

| | | | |
|---|---|---|---|
| 2009/0119298 A1* | 5/2009 | Faitelson et al. | ................. 707/9 |
| 2010/0146600 A1* | 6/2010 | Eldar et al. | ....................... 726/5 |
| 2011/0167483 A1* | 7/2011 | Lee | ........................ H04L 63/104 726/6 |
| 2012/0198559 A1* | 8/2012 | Venkata Naga Ravi | ....... 726/26 |

* cited by examiner

*Primary Examiner* — Brandon Hoffman
*Assistant Examiner* — Nega Woldemariam
(74) *Attorney, Agent, or Firm* — Lee & Hayes, PLLC

(57) ABSTRACT

The present subject matter relates to assigning access rights in enterprise digital rights management (eDRM) systems. In one embodiment, a method includes receiving, by an enterprise digital rights management (eDRM) device, user data corresponding to a plurality of users. Further, the method includes creating a user group based on the user data. The user group, thus created, is sent for storage in a repository associated with an eDRM server, enabling the user group to be accessible by a plurality of eDRM devices.

6 Claims, 4 Drawing Sheets

ASSIGNING ACCESS RIGHTS IN ENTERPRISE DIGITAL RIGHTS MANAGEMENT SYSTEMS

TECHNICAL FIELD

The present subject matter described herein relates, in general, to enterprise digital rights management systems and, in particular, relates to assigning access rights in the enterprise digital rights management systems.

BACKGROUND

Various enterprise digital rights management (eDRM) systems are generally used within an enterprise for protecting documents (hereinafter referred to as enterprise documents) that may contain confidential information, such as product overviews, marketing plans, customer lists, and sales reports. Such eDRM systems facilitate protection of the enterprise documents by encrypting the enterprise documents and assigning one or more access rights, such as an open right, an edit right, a copy right, and a print right for users within the enterprise. Generally, the access rights define how the users within the enterprise can access and make use of the enterprise documents.

The eDRM systems restrict or limit access to the enterprise documents based on the access rights. Typically, access to the enterprise documents is restricted to only the users having the access rights assigned by an authorizer. The authorizer may be, for example, a user who owns the enterprise document. The authorizer may assign access rights to different users within the enterprise based on various parameters, such as business or functional requirements. Further, the authorizer may assign access rights to the users upon receiving request for the access rights from the users. For assigning the access rights to the enterprise document, the authorizer typically select one user at a time and assign the access rights to the user. The authorizer then repeats the same process for assigning the access rights to the other users.

SUMMARY

This summary is provided to introduce concepts related to assigning access rights in the enterprise digital rights management systems and the concepts are further described below in the detailed description. This summary is not intended to identify essential features of the claimed subject matter nor is it intended for use in determining or limiting the scope of the claimed subject matter.

In one embodiment, a method includes receiving, by an enterprise digital rights management (eDRM) device, user data corresponding to a plurality of users. Further, the method includes creating a user group based on the user data. The user group, thus created, is sent for storage in a repository associated with an eDRM server, enabling the user group to be accessible by a plurality of eDRM devices.

In another embodiment, a method includes receiving, by an eDRM device, user data and access rights data corresponding to at least one user. Further, the method includes creating a user template based on the user data and the access rights data. The user template, thus created, is sent for storage in a repository associated with an eDRM server, enabling the user template to be accessible by a plurality of eDRM devices.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
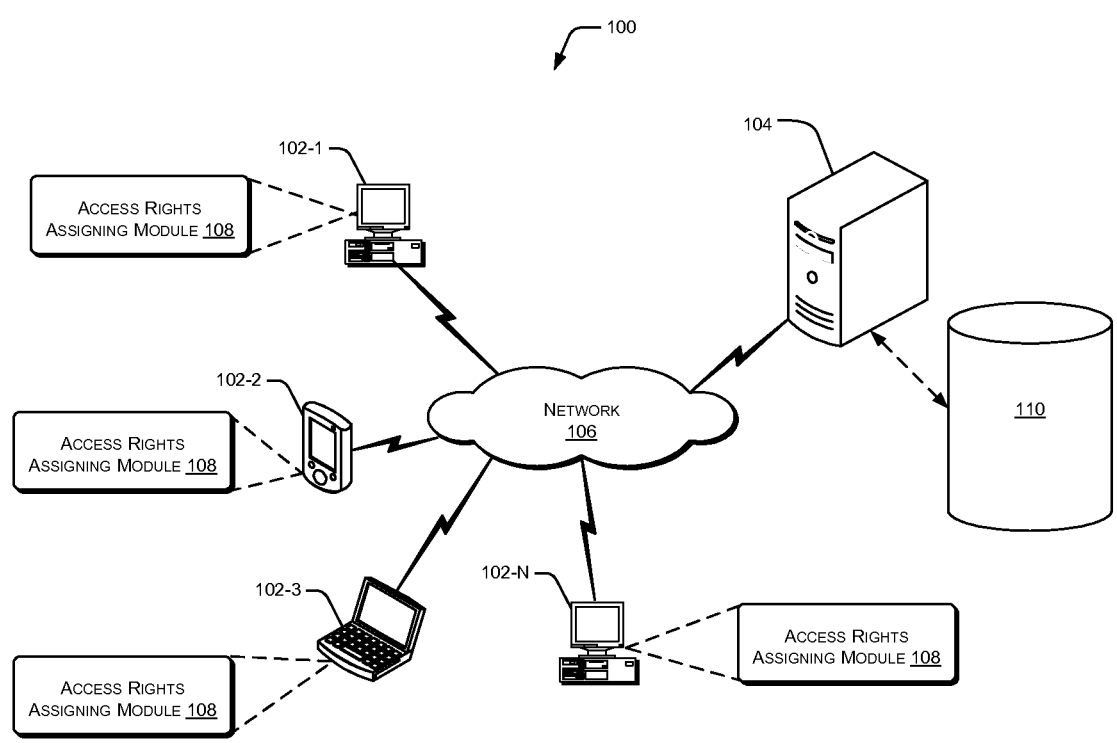
FIG. 1 illustrates a network implementation of an enterprise digital rights management (eDRM) system, in accordance with an embodiment of the present subject matter.

Conventional eDRM systems allow an authorizer to assign access rights to a user for accessing an enterprise document. For assigning access rights to the user, the authorizer selects the user, and assigns one or more access rights to the user. The authorizer typically repeats the same process for assigning access rights to other users. In certain cases, when access rights are to be assigned to only few users amongst a large number of users, then selecting those few users from the large number of users everytime for assigning access rights becomes time consuming and laborious. Further, when certain specific access rights are to be assigned to those few users for a number of enterprise documents, then selecting the users from the large number of users and assigning those specific access rights to the users for each enterprise document also consume more time and efforts.

The present subject matter relates to systems and method for assigning access rights to an enterprise document. The system and methods simplify the process of assigning access rights to the users. The access rights may include, but are not limited to, an open access right, an edit access right, a copy access right, and a print access right.

The open access right may be defined as an access right that enables the users to open the enterprise document for reading. The edit access right may be understood as an access right that enables the users to modify the enterprise document. The copy access right may be defined as an access right that enables the user to copy content from the enterprise document and take screenshots of the enterprise document. The print access right may be understood as an access right that enables the user to print the enterprise document. The access rights define how the users within the enterprise may access and make use of the enterprise documents. For example, certain access rights may not be assigned to the users to limit the users' access to the enterprise document, or all the access rights may be assigned to the users provide full access to the enterprise document.

In accordance with the present subject matter, user groups and user templates can be created to simplify the process of assigning access rights to the users for accessing various enterprise documents. The user group may be understood as a group of users. The user template may be understood as a group of users, where specific access rights are defined for each of the group of users.

In an example, the user groups may be created when access rights are to be assigned to a set of users, repeatedly, for accessing various enterprise documents. While assigning access rights to the set of users, the user group can be selected and access rights can be assigned to each user in the user group. Once created, the user groups can be saved for later use.

In another example, the user template can be created when certain specific access rights are to be assigned to a user or a set of users, repeatedly, for accessing various enterprise documents. The user template associates specific access rights to each user. The user template, thus, represents the user or the set of users and access rights associated with the user(s). While assigning access rights, the user template can be selected and the user(s) in the user template can be authorized to access any enterprise document based on associated specific access rights. Once created, the user templates can be saved for later use.

In one implementation, the user groups and the user template are stored in a repository, such as a central repository, associated with a server enabling easy accessibility of the user groups and the user template from any eDRM device.

These and other advantages of the present subject matter would be described in greater detail in conjunction with the following figures. While aspects of described systems and methods for assigning access rights to an enterprise document can be implemented in any number of different computing systems, environments, and/or configurations, the embodiments are described in the context of the following exemplary system(s).

FIG. 1 illustrates a network implementation of an eDRM system 100, in accordance with an embodiment of the present subject matter.

In one implementation, the eDRM system 100 comprises a plurality of client devices 102-1, 102-2, 102-3, . . . 102-N (hereinafter referred to as eDRM devices) connected to a server 104 (hereinafter referred to as eDRM server), through a network 106. For the sake of clarity, the eDRM devices 102-1, 102-2, 102-3, . . . 102-N are collectively referred to as the eDRM devices 102 and individually referred to as an eDRM device 102. The eDRM devices 102 may include, without limitation, desktop computers, laptops or other portable computing devices, and network computing devices.

The eDRM server 104 may be implemented in a variety of computing systems, such as a laptop computer, a desktop computer, a notebook, a workstation, and a mainframe computer.

The network 106 may be a wireless network, wired network or a combination thereof. The network 106 can be implemented as one of the different types of networks, such as intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 106 may include a variety of network devices, including routers, bridges, servers, computing devices, storage devices.

In one implementation, the eDRM devices 102 communicates with the eDRM server 104 for various purposes including, but not limited to, assigning access rights to a plurality of users for accessing various enterprise documents. The eDRM devices may be equipped with, for example, an eDRM application installed therein. A plurality of users may interact with an eDRM interface (not shown in the figure) from their corresponding eDRM devices 102 to communicate with the eDRM application for assigning access rights.

In one implementation, the users having authority to assign access rights to the plurality of other users for various enterprise documents may use the eDRM devices 102 for creating user groups and/or user templates for assigning access rights to other users. As described previously, the user group may be understood as a set of users, and the user template may be understood a user or a set of users having associated or pre-defined access rights. For the sake of clarity, the user having authority to assign access rights is hereinafter referred to as an authorizer, and other users to whom access rights are to be assigned are referred as users. The authorizer may include a document owner and an administrator. The document owner may be understood as the user having ownership of the enterprise document and thus, the owner can encrypt the enterprise document, share the enterprise document with other users, and assign or control access rights to other users for accessing the enterprise document. The administrators may be understood as users having administrative powers to control and manage all the owners, temporary owners, other users, the enterprise documents, and/or eDRM devices within the enterprise.

The eDRM device 102 is configured to create the user groups and/or user templates upon receiving input data from the authorizer. In one implementation, when the user group is to be created the eDRM device 102 may be provided with the user data as input data. The user data includes user identifier (ID) of the users. In another implementation, when user template is to be created the eDRM device 102 may be provided with the user data and access rights data as input data. The user data includes user ID, and access rights data includes one or more access rights assigned to the users.

In one implementation, the eDRM device 102 includes an access rights assigning module 108 that receives the input data, i.e., the user data and/or the access rights data provided by the authorizer and creates the user group and/or the user template. Subsequent to the creation, the access rights assigning module 108 sends the user group and/or the user template to the eDRM server 104 for storage in a central repository 110, which is associated with the eDRM server 104. It will be appreciated that the user groups and/or templates stored in the central repository can be accessed from any of the eDRM devices 102 connected to the eDRM server 104.

In one example, the authorizer may use the user group stored in the central repository 110 to assign access rights to the group of users for accessing the enterprise document. For example, access rights may be assigned to the users in the user group by selecting the user group and then selecting the access rights to be assigned to each user in the user group. By doing so, the tedious operation of selecting each user individually from a plurality of users within the enterprise is eliminated. In said example, the access rights assigning module 108 enforces the assigned access rights on the enterprise document for the group of users.

In another example, the authorizer may use the user template stored in the central repository 110 to authorize the user or the group of users in the user template to access any enterprise document based on the corresponding access rights as defined in the user template. For example, to authorize the user(s) to access an enterprise document, the authorizer may apply the user template to the enterprise document. Further, the same user template can be applied to other enterprise documents. By doing so, the tedious operation assigning access rights to the same user(s) for a number of enterprise documents is eliminated. In said example, the access rights assigning module 108 enforces the access rights in the user template for the corresponding users, thus controlling the way the users access the enterprise document(s). Creating the user groups and user templates, thus, simplifies the process of assigning access rights to the users for various enterprise documents.

Figure 2:
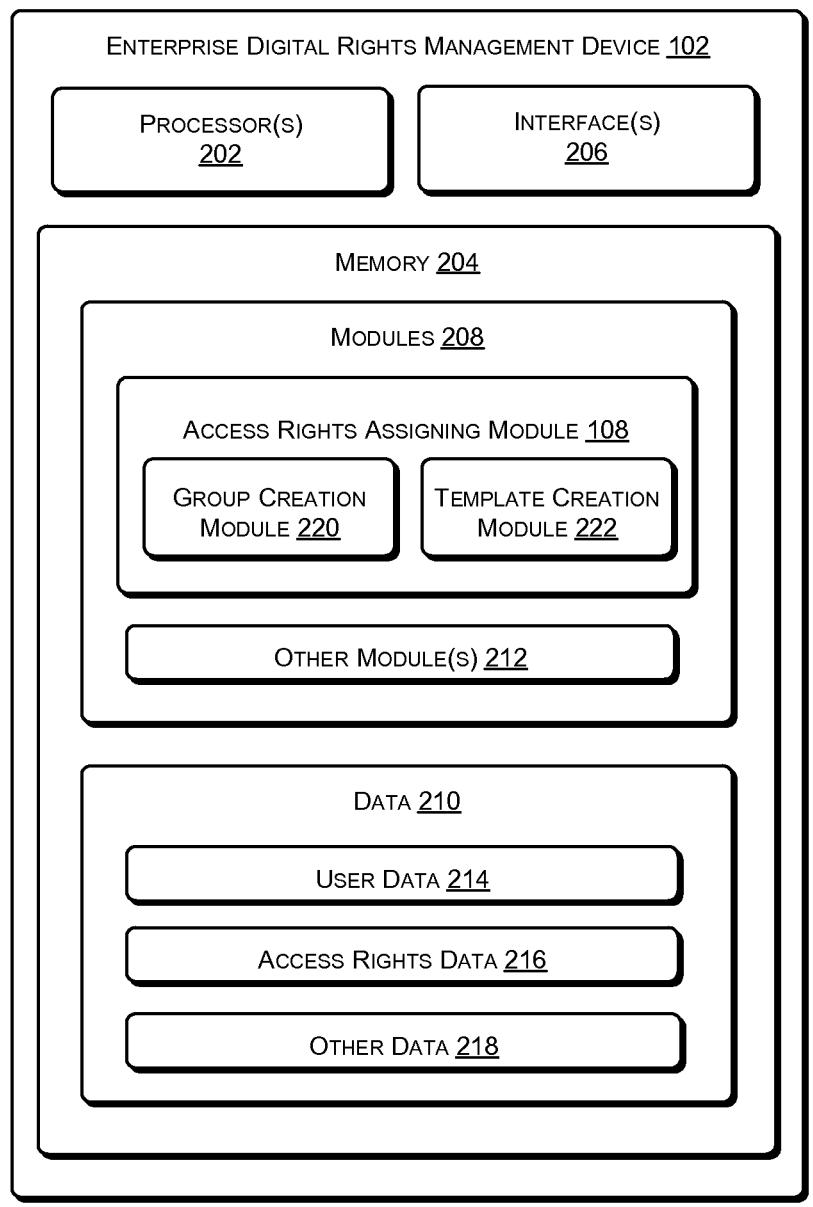
FIG. 2 illustrates components of an eDRM device, in accordance with an embodiment of the present subject matter.

FIG. 2 illustrates components of the eDRM device 102, according to an embodiment of the present subject matter. In said embodiment, the eDRM device 102 includes one or more processor(s) 202, a memory 204 coupled to the processor 202, and interface(s) 206.

The processor 202 can be a single processing unit or a number of units, all of which could include multiple computing units. The processor 202 may be implemented as one or more microprocessors, microcomputers, microcontrollers, digital signal processors, central processing units, state machines, logic circuitries, and/or any devices that manipulate signals based on operational instructions. Among other capabilities, the processor 202 is configured to fetch and execute computer-readable instructions and data stored in the memory 204.

The interface(s) 206 may include a variety of software and hardware interfaces, for example, a web interface, a graphical user interface, allowing the user to interact with the eDRM device 102. Further, the interface(s) 206 may enable the eDRM device 102 to communicate with other computing devices, such as web servers and external data servers (not shown in figure). The interface(s) 206 can facilitate multiple communications within a wide variety of networks and protocol types, including wired networks, for example LAN, cable, and wireless networks such as WLAN, cellular, or satellite. The interface(s) 206 may include one or more ports for connecting the eDRM device 102 to a number of other devices to or to another server. In one implementation, the interface(s) 106 includes an eDRM interface (not shown in the figure) to the eDRM application installed on the eDRM device 102. The eDRM interface may be a secured interface configured to provide access to the eDRM application.

The memory 204 may include any computer-readable medium known in the art including, for example, volatile memory such as static random access memory (SRAM) and dynamic random access memory (DRAM), and/or non-volatile memory, such as read only memory (ROM), erasable programmable ROM, flash memories, hard disks, optical disks, and magnetic tapes. The memory 204 includes modules 208 and data 210.

The modules 208 include routines, programs, objects, components, data structures, etc., which perform particular tasks or implement particular abstract data types. In one implementation, the modules 208 include the access rights assigning module 108, and other module(s) 212. The access rights assigning module 108 includes a group creation module 220, and a template creation module 222. The other module(s) 212 may include programs or coded instructions that supplement applications and functions of the eDRM device 102.

The data 210, amongst other things, serves as a repository for storing data processed, received, and generated by one or more of the module(s) 208. The data 210 includes user data 214, access rights data 216, and other data 218. The other data 218 includes data generated as a result of the execution of one or more instructions by the other module(s) 212.

In accordance with an embodiment of the present subject matter, the group creation module 220 within the access rights assigning module 108 receives user data from an authorizer for creating a user group. The user data includes user identifier (ID) of the users that are to be included in the user group. Upon receiving the user data, the group creation module 220 creates the user group. The user group, thus created, may be displayed to the user on the eDRM interface.

Such a user group can be created when access rights are to be assigned to multiple users for various enterprise documents. Considering a situation where a team manager having authority to assign access rights for certain enterprise documents may often need to assign all access rights to his team containing 50 team members for one or more of such enterprise documents. In such a situation, the team manager may create a user group, namely, 'My Team' consisting of the above mentioned 50 team members. Whenever the team manager wants to assign the access rights to his team, the team manager may select the group 'My team' rather than searching for the 50 team members one by one for assigning the access rights to each of the 50 team members. The group 'My team' displays all the 50 users a one go, thereby minimizing a large number of user look-ups.

In one implementation, subsequent to creation of the user group, the group creation module 220 may send the user group to the eDRM server 104 for storage in the central repository 110 associated with the eDRM server 104. Since the user groups are stored in a common or central repository, rather than being stored in the local repository of the eDRM devices 102, it is evident that these user groups can be accessed from any of the eDRM devices.

In one implementation, the group creation module 220 enables updating the user group stored in the central repository 110 upon receiving updated user data from the authorizer. For example, the authorizer may be provided with flexibility to add new users in the user group, or delete existing users from the user group. Once the authorizer provides the updated user data, i.e., updated user IDs, the group creation module 220 retrieves the user group from the central repository 110, updates the user group, and sends the updated user group for storage in the central repository 110.

In accordance with another embodiment of the present subject matter, the template creation module 222 within the access rights assigning module 108 receives the user data and the access rights data from the authorizer for creating a user template. The user data includes the user ID of the users to be included in the user template, and the access rights data includes the access rights assigned to the users. Upon receiving the user data and the access rights data, the template creation module 222 creates the user template.

Such a user template can be created when certain specific access rights are to be assigned to a user or a group of users for various enterprise documents. Considering a situation where a project manager having authority to assign access rights for certain enterprise documents, often assign some specific set of access rights to each of a plurality of users. As an instance, the project manager often assign all the access rights to 'John', who is a project lead, and 'open' and 'print' access rights to the project team members 'Priya', 'Sandy' and 'Peter'. The project manager can therefore create a user template, namely, 'My Project Team' to repeatedly authorize the users 'John', 'Priya', 'Sandy' and 'Peter' to access a number of enterprise documents based on the access rights defined in the user template. For example, all the access rights to 'John', and 'open' and 'print' access rights to 'Priya', 'Sandy' and 'Peter'.

In one implementation, subsequent to creation of the user template, the template creation module 222 may send the user template to the eDRM server 104 for storage in the central repository 110. The stored user template in the central repository 110 can be accessed from any of the eDRM devices 102 connected to the eDRM server 104 via the network 106. The authorizers may access their corresponding user templates from the central repository 110, whenever required.

In one implementation, the template creation module 222 enables updating the user template stored in the central repository 110 upon receiving updated user data and/or updated access rights data from the authorizer. For example, the authorizer may be provided with flexibility to add new users and define access rights corresponding to the new users in the user group, delete existing users and their corresponding access rights from the user template, modify the access rights assigned to the users in the user template. Once the authorizer provides the updated user data, i.e., user IDs and/or updated access rights, the template creation module 222 retrieves the user template from the central repository 110, updates the user template, and sends the updated user group for storage in the central repository 110. In another implementation, the users may be provided with provisions of updating the user template before use, without storing the modifications made to the user template.

Figure 3:
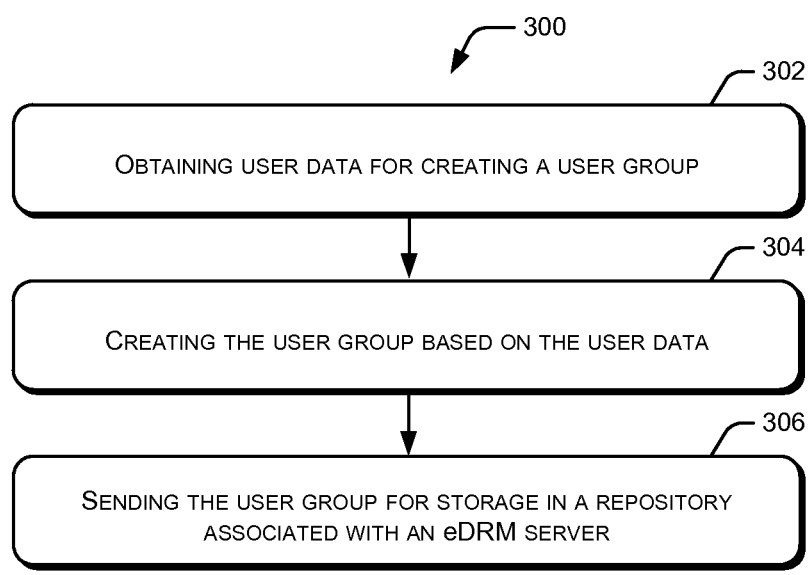
FIG. 3 illustrates a method for creating a user group, in accordance with an embodiment of the present subject matter.
Figure 4:
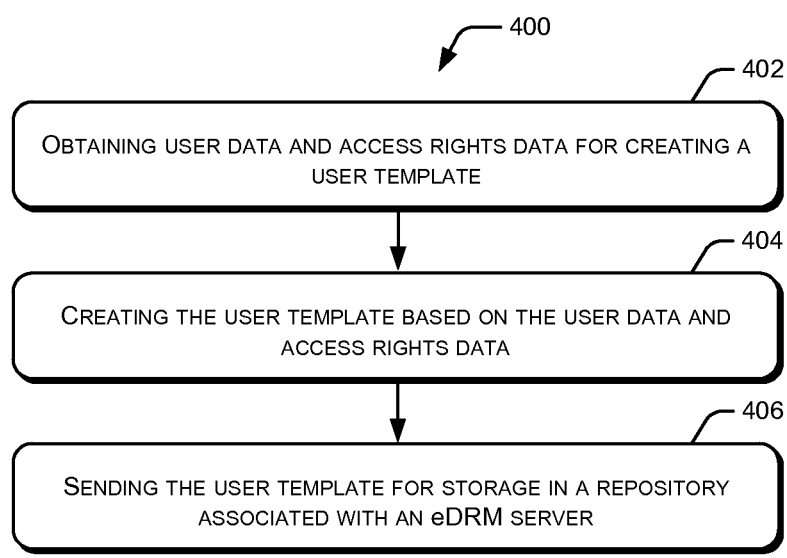
FIG. 4 illustrates a method for creating a user template, in accordance with another embodiment of the present subject matter.

FIG. 3 illustrates an exemplary method 300 for creating a user group, in accordance with an embodiment of the present subject matter, and FIG. 4 illustrates a method 400 for creating the user template, in accordance with another embodiment of the present subject matter. The methods 300 and 400 may be described in the general context of computer executable instructions. Generally, computer executable instructions can include routines, programs, objects, components, data structures, procedures, modules, and functions that perform particular functions or implement particular abstract data types. The methods 300 and 400 may also be practiced in a distributed computing environment where functions are performed by remote processing devices that are linked through a communication network. In a distributed computing environment, computer executable instructions may be located in both local and remote computer storage media, including memory storage devices.

The order in which the methods 300 and 400 are described is not intended to be construed as a limitation, and any number of the described method blocks can be combined in any order to implement the methods 300 and 400, or alternative methods. Additionally, individual blocks may be deleted from the methods 300 and 400 without departing from the spirit and scope of the subject matter described herein. Furthermore, the methods 300 and 400 can be implemented in any suitable hardware, software, firmware, or combination thereof.

Referring to FIG. 3, which illustrates the method 300 for creating a user group, in accordance with an embodiment of the present subject matter, the method is initiated at block 302.

At the block 302, user data for creating a user group is obtained. In one implementation, the group creation module 220 within the eDRM device 102 receives the user data from an authorizer. The group creation module 220 may store the user data as the user data 214 within the eDRM device 102.

At block 304, the user group is created based on the user data. The user group consists of a plurality of users. In one implementation, the group creation module 220 creates the user group. Such a user group may be used for various purposes including, but not restricted to, assigning access rights to the plurality of users, repeatedly, for accessing various enterprise documents.

At block 306, the user group is sent for storage in a repository associated with an eDRM server. Such a repository (interchangeably referred to as central repository) is accessible by a plurality of eDRM devices connected to the eDRM server. In one implementation, the group creation module 220 sends the user group to the eDRM server 104, which stores the user group in the central repository 110. The stored user group can be accessed from the central repository 110 used as many times as required to assign access rights to the users in the user group. For example, the user group can be selected and access rights can be assigned to each user in the user group separately for various enterprise documents.

In one implementation, the stored user group can be updated, in the event of any modification made to the user group. For example, if new user(s) are added to the user group or one or more existing users are deleted from the group, the group creation module 220 updates the user group and sends the updated user group for storage in the central repository 110.

Referring now to FIG. 4, which illustrates the method 400 for creating a user template, in accordance with another embodiment of the present subject matter. The method is initiated at block 402, where user data and access rights data for creating a user template is obtained. The user data may include user identifier (ID) corresponding to each user. The access rights data includes access rights, such as open, edit, copy, and print access right assigned to the user.

In one implementation, the template creation module 222 within the eDRM device 102 receives the user data and the access rights data from an authorizer. The template creation module 222 may store the user data and the access rights data as the user data 214 and the access rights data 216 respectively, within the eDRM device 102.

At block 404, the user template is created based on the user data and the access rights data. In one implementation, the template creation module 222 creates the user template based on the user data and the access rights data. The user template thus consists of the users and the access rights corresponding to the users. In other words, the user template associates the certain access rights to each of the users. Such a user template may be used for various purposes, such as authorizing the users in the user template to access various enterprise documents based on the access rights defined in the user template.

At block 406, the user template, thus created, is sent to an eDRM server for storage in a repository associated with the eDRM server. In one implementation, the template creation module 222 sends the user template to the eDRM server 104 for storage in the central repository 110. The stored user template can be accessed and used, whenever required. In one implementation, the stored user template can be updated, in the event of any modification made to the users, the access rights assigned to the users, or both. The users in the user template can be authorized to use any enterprise document based on the access rights defined in the user template.

Although implementations for methods and systems for assigning access rights in the enterprise digital rights management systems have been described in language specific to structural features and/or methods, it is to be understood that the appended claims are not necessarily limited to the specific features or methods described. Rather, the specific features and methods are disclosed as exemplary implementations for assigning access rights in the enterprise digital rights management systems.

We claim:

1. A method comprising:
receiving, by an enterprise digital rights management (eDRM) device, user data and access rights data corresponding to a user group from an authorizer for assigning one or more specific access rights to at least one user of the user group, wherein the authorizer is at least one user having an authority to assign access rights from amongst a plurality of users, and wherein the one or more specific rights are defined for each user from the plurality of user such that the each user access is limited within an enterprise;
creating, by the eDRM device, a user template based on the user data and the access rights data received from the authorizer, the user template comprises one or more specific access rights associated with the at least one user of the user group, the one or more specific access rights being obtained from the access rights data,
sending the created user template to a central repository associated with an eDRM server connected to a plurality of eDRM devices including the eDRM device that created the user template for storing the created user template in the central repository, wherein the user template being accessible by each of the plurality of eDRM devices; and
authorizing, by at least one of the plurality of eDRM devices, the at least one user of the user group to access each of a plurality of enterprise documents based on the one or more access rights in the user template selected from a plurality of user templates stored in the central repository, wherein the user template is applied to access the enterprise document based on associated one or more specific access rights, and wherein the authorizing comprises applying the user template to each of the plurality of enterprise documents.

2. The method as claimed in claim 1, wherein the method further comprising updating the stored user template upon receiving at least one of updated user data and updated access rights data.

3. An enterprise digital rights management (eDRM) device comprising:
a processor; and
a memory coupled to the processor, the memory comprising:
a template creation module configured to:
create a user template based on user data and access rights data corresponding to a user group received from an authorizer for assigning one or more specific access rights to at least one user of the user group, wherein the user template comprises the one or more specific access rights associated with the at least one user of the user group, and wherein the one or more specific access rights are obtained based on the access rights data, and wherein the one or more specific rights are defined for each user from the plurality of user such that the each user access is limited within an enterprise; and
send the user template to a central repository associated with an eDRM server connected to a plurality of eDRM devices including the eDRM device that created the user template for storing the created user template in the central repository, the user template being accessible by each of the plurality of eDRM devices to authorize the at least one user of the user group to access each of a plurality of enterprise documents according to the one or more specific access rights in the user template, the user template being selected from a plurality of user templates stored in the central repository, wherein the user template is applied to access the enterprise document based on associated one or more specific access rights, and wherein the at least one user of the user group is authorized based on applying the user template to each of the plurality of enterprise documents.

4. The eDRM device as claimed in claim 3, wherein the template creation module is further configured to update the stored user template upon receiving at least one of updated user data and updated access rights data.

5. A non-transitory computer-readable medium having embodied thereon a computer program for executing a method comprising:
receiving, by an enterprise digital rights management (eDRM) device, user data and access rights data corresponding to a user group from an authorizer for assigning one or more specific access rights to at least one user of the user group, wherein the authorizer is at least one user having an authority to assign access rights, from amongst a plurality of users, and wherein the one or more specific rights are defined for each user from the plurality of user such that the each user access is limited within an enterprise;
creating, by the eDRM device, a user template based on the user data and the access rights data received from the authorizer, the user template comprises one or more specific access rights associated with the at least one user of the user group, the one or more specific access rights being obtained from the access rights data,
sending the created user template to a central repository associated with an eDRM server connected to a plurality of eDRM devices including the eDRM device that created the user template for storing the created user template in the central repository, wherein the user template being accessible by each of the plurality of eDRM devices; and
authorizing, by at least one of the plurality of eDRM devices, the at least one user of the user group to access each of a plurality of enterprise documents based on the one or more access rights in the user template selected from a plurality of user templates stored in the central repository, wherein the user template is applied to access the enterprise document based on associated one or more specific access rights, and wherein the authorizing comprises applying the user template to each of the plurality of enterprise documents.

6. The computer-readable medium as claimed in claim 5, wherein the method further comprising updating the stored user template upon receiving at least one of updated user data and updated access rights data.

* * * * *